US009392876B2

(12) United States Patent
Tyree

(10) Patent No.: US 9,392,876 B2
(45) Date of Patent: Jul. 19, 2016

(54) ADVANCED CONFORMANCE ENCASED COIL SPRING UNITS

(71) Applicant: Sealy Technology, LLC, Trinity, NC (US)

(72) Inventor: Steven Tyree, High Point, NC (US)

(73) Assignee: Sealy Technology, LLC, Trinity, NC (US)

( * ) Notice: Subject to any disclaimer, the term of this patent is extended or adjusted under 35 U.S.C. 154(b) by 0 days.

(21) Appl. No.: 14/487,344

(22) Filed: Sep. 16, 2014

(65) Prior Publication Data

US 2015/0001770 A1 Jan. 1, 2015

Related U.S. Application Data

(63) Continuation of application No. 13/470,767, filed on May 14, 2012, now Pat. No. 8,857,799.

(60) Provisional application No. 61/485,284, filed on May 12, 2011.

(51) Int. Cl.
*F16F 3/04* (2006.01)
*A47C 23/043* (2006.01)
*B68G 9/00* (2006.01)

(52) U.S. Cl.
CPC ................ *A47C 23/043* (2013.01); *B68G 9/00* (2013.01)

(58) Field of Classification Search
CPC ...... B68G 9/00; A47C 27/063; A47C 27/064; A47C 27/056; A47C 23/043
USPC ............ 267/91, 89, 93, 94; 53/114, 115, 527; 5/655.7, 655.8, 716, 720
See application file for complete search history.

(56) References Cited

U.S. PATENT DOCUMENTS 1,284,384 A * 11/1918 Lewis .................. A47C 27/064 5/720
3,083,381 A * 4/1963 Bailey .................. A47C 27/063 219/217
3,633,228 A * 1/1972 Zysman .................. A47C 7/20 267/143
4,523,344 A * 6/1985 Stumpf ................ A47C 27/063 5/655.8
4,578,834 A * 4/1986 Stumpf ................ A47C 27/064 156/291
5,319,815 A * 6/1994 Stumpf ................ A47C 27/064 5/720
6,272,706 B1 * 8/2001 McCune .............. A47C 27/064 267/91
6,315,275 B1 * 11/2001 Zysman .................. B68G 9/00 267/89
6,467,240 B2 * 10/2002 Zysman .................. B68G 9/00 53/114
6,698,166 B2 * 3/2004 Zysman .................. B68G 9/00 5/655.8
6,952,850 B2 * 10/2005 Visser .................. A47C 27/056 5/690
7,048,263 B2 * 5/2006 Ahlqvist .................. B68G 9/00 267/91

(Continued)

*Primary Examiner* — Pamela Rodriguez

(57) ABSTRACT

Encased coil units with advance conforming properties have various interconnections and structures between individually encased or wrapped coils. In the various embodiments, encasement structures between coils such as closure or attachment of sheet material or fabric, which encase the coils, are configured to allow and enhance independent movement of coils with respect to adjacent coils and remote coils of the unit. Modifications in the sheet material or fabric which encases the coils include variations in the points of connection or disconnection between adjacent coils, such as slits in the material proximate to top ends of the coils in a continuous string, or the absence of welds or glue points between adjacent encasements or strings of encasements, proximate to top ends of the coils to allow more freedom of movement of the top or upper ends of the coils and with respect to adjacent coils, and to reduce load transfer or cratering of the coil springs about the locus of the force vector.

5 Claims, 4 Drawing Sheets

(56) References Cited

U.S. PATENT DOCUMENTS

| | | | | |
|---|---|---|---|---|
| 7,748,065 | B2 * | 7/2010 | Edling | A47C 27/064 29/91.1 |
| 7,814,594 | B2 * | 10/2010 | DeFranks et al. | 5/716 |
| 8,857,799 | B2 * | 10/2014 | Tyree | 267/91 |
| 2003/0093864 | A1 * | 5/2003 | Visser et al. | 5/720 |
| 2004/0133988 | A1 * | 7/2004 | Barber | 5/716 |
| 2007/0124865 | A1 * | 6/2007 | Stjerna | 5/720 |
| 2007/0289068 | A1 * | 12/2007 | Edling | 5/720 |
| 2010/0180385 | A1 * | 7/2010 | Petrolati et al. | 5/720 |

* cited by examiner

ADVANCED CONFORMANCE ENCASED COIL SPRING UNITS

RELATED APPLICATIONS

This application is a continuation of U.S. application Ser. No. 13/470,767 filed May 14, 2012, now U.S. Pat. No. 8,857,799 which claims priority to U.S. Provisional Patent Application No. 61/485,284, filed on May 12, 2011, which is incorporated herein by reference in its entirety.

FIELD OF THE INVENTION

The present invention is in the field of reflexive support systems including support systems for humans such as bedding or seating.

BACKGROUND OF THE INVENTION

Encased coil spring units for mattresses and other reflexive support applications have long been manufactured by the use of long strips of sheet or fabric material which is folded or cut in halves and secured about a line of coil spring to form a spring unit. Various methods of attachment of the sheet material between each coil spring to and between adjacent rows or columns of encased coil springs have been used, such as stitches through the sheet material, ultrasonic welding or gluing. Because each coil spring is uniformly encapsulated in the material and also attached to the material surrounding adjacent coils, the encased coil spring unit is stabilized by the encapsulating material and provides a support structure and surface which distributes a load over a broad area relative to the primary force vector as a result of the common interconnection of the coil springs.

SUMMARY OF THE INVENTION

Encased coil units with advance conforming properties have various interconnections and structures between individually encased or wrapped coils. In the various embodiments, structures between coils such as closure or attachment of sheet material or fabric, which encase the coils, are configured to allow independent movement of coils with respect to adjacent coils. Modifications in the sheet material or fabric which encases the coils include variations in the points of connection or disconnection between adjacent coils, such as slits in the material proximate to top ends of the coils in a continuous string, or the absence of welds or glue points between adjacent encasements or strings of encasements, proximate to top ends of the coils to allow more freedom of movement of the top or upper ends of the coils and with respect to adjacent coils, and to reduce load transfer or cratering of the coil springs 12 about the locus of the force vector.

GENERAL DESCRIPTION OF PREFERRED AND ALTERNATE EMBODIMENTS

Figure 1:
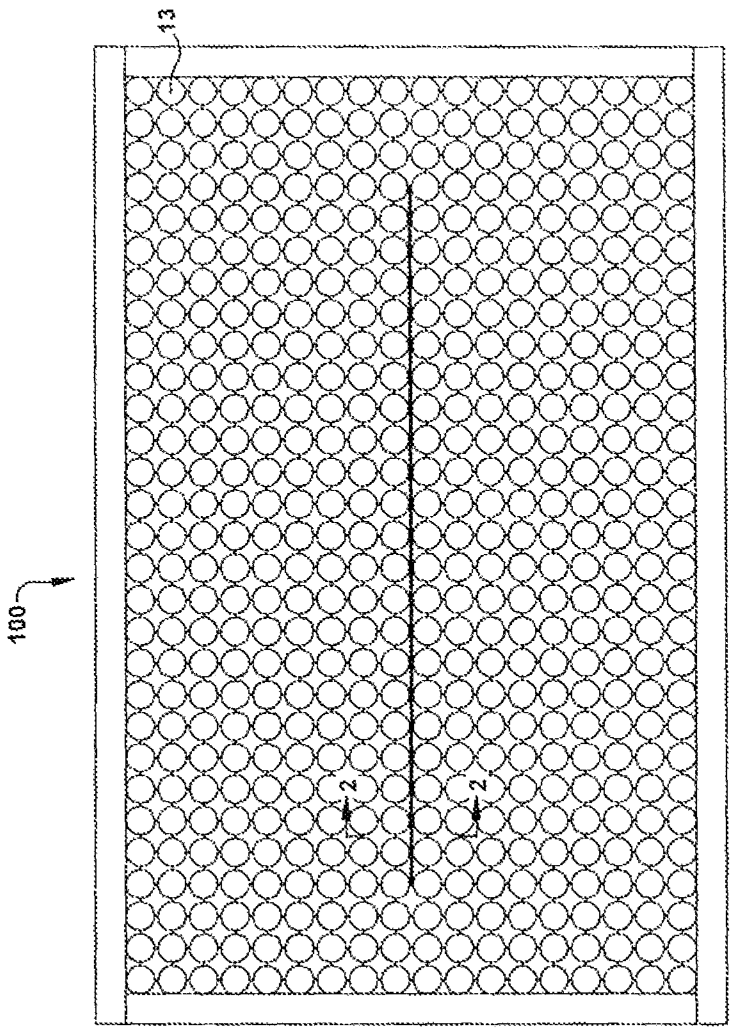
FIG. 1 is a top view of an Advanced Conformance Encased Coil Spring Unit of the present invention.

Encased coil units 100 with advance conforming properties have various interconnections and structures between individually encased or wrapped coils 13. In the various embodiments, structures between coils such as closure or attachment of sheet material or fabric, which encase the coils, is configured to allow independent movement of coils with respect to adjacent coils. Modifications in the sheet material or fabric which encases the coils, referred to generally in the figures at reference numeral 14 and particularly the sheet material between the coils, include variations in the points of connection 16 or disconnection between adjacent coils, such as slits 15 in the material proximate to top ends of the coils 12 in a continuous string, or the absence of welds or glue points 16 between adjacent encasements or strings of encasements, proximate to top ends of the coils 12 to allow more freedom of movement of the top or upper ends of the coils 12 and with respect to adjacent coils, and to reduce load transfer or cratering of the coil springs 12 about the locus of the force vector. In these embodiments, each coil 12 remains individually encased in the sheet material 14, which completely encircles and encloses the coil 12 circumferentially and from top to bottom, but each coil 12 so encased is not necessarily attached to adjacent encased coils 13 along an entire length of the coil encasements, i.e. from top to bottom, and preferably has fewer structural attachments 16 between the encasements 14 about upper regions of the coils 12 than about lower regions of the coils 12. This is particularly advantageous with respect to the upper ends of the coils 12 which would otherwise compress and move by region or area of compression about the point or loading, rather than to individual extents, and applicable to one-sided mattresses for upper support side of the coil spring unit to have the ability for the described independent coil movement, while the lower half of the coil spring unit remains relatively more structurally interconnected.

Figure 2:
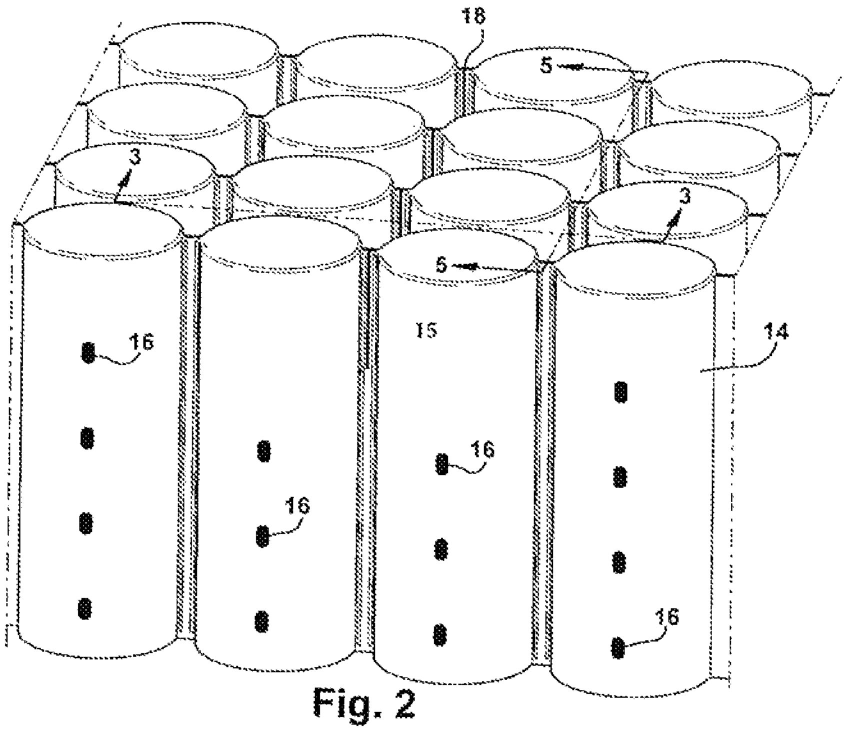
FIG. 2 is a side view of the Advanced Encased Coil Spring Unit of FIG. 1 from the direction of arrows 2-2.
Figure 3:
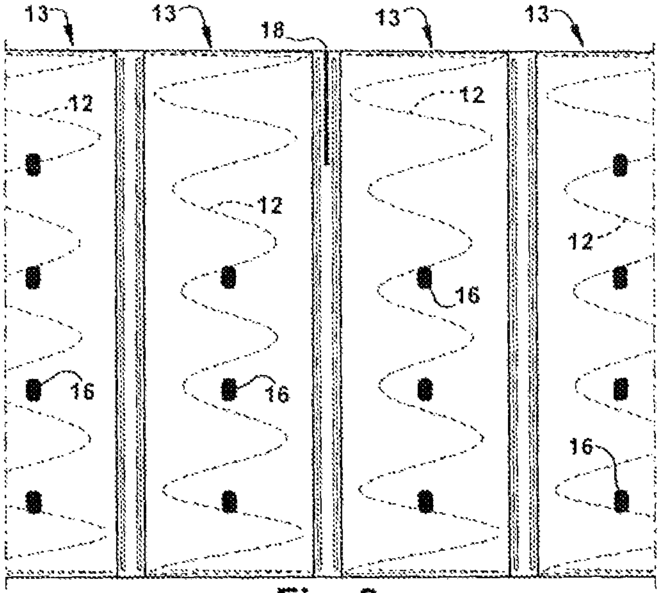
FIG. 3 is a front view of two center coils of the Advanced Conformance Encased Coil Spring Unit of FIG. 1.
Figure 4:
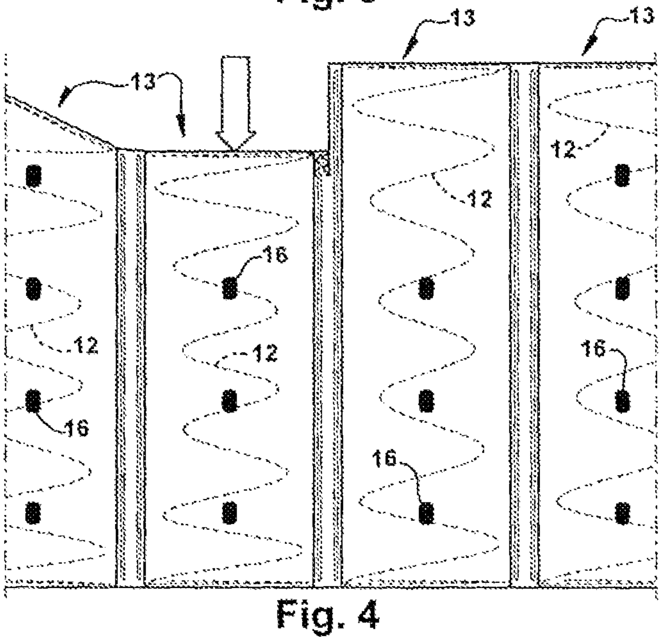
FIG. 4 is a front view of the two center coils of FIG. 3 with one of the coils having force exerted thereon.
Figure 5:
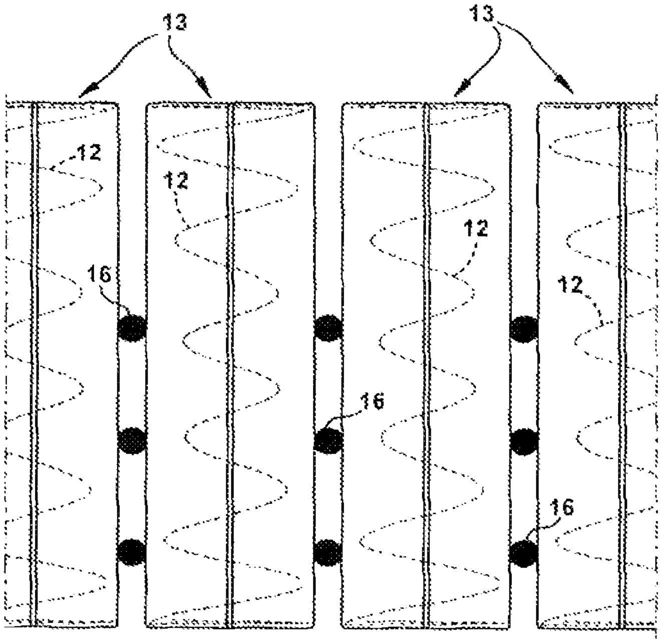
FIG. 5 is a front view of the coils of FIG. 2 from the direction of arrows 5-5.

In one particular embodiment, an advanced conformance encased coil spring unit 100 of the present disclosure, has separations 18 between adjacent coil encasements 13 of a continuous strand of coils, and has one or more points or areas of connection 16 of the encasement material 14 between a first strand of coils and an adjacent strand of coils, wherein the one or more points or areas of connection 16 are not located adjacent to the separations 18, as shown in FIGS. 2, 3 and 4. Referring to FIG. 1, the horizontal rows of adjacent coils are attached together at one or more attachment points via glue, welding or other such attachment mechanism, while the vertical columns of adjacent coils are sewn or fused together. The separations 18 in the encasement material 14 between coils 12 is preferably proximate to an upper region of the coils 12, shown in FIGS. 2 and 3, and the one or more points or areas of connection 18 the encasement material 14 between adjacent strands of coils 12 are preferably proximate to a lower region of the coils 12 shown in FIG. 5. For example as shown in FIG. 3, two horizontally adjacent center coils 12 contain a separation 18 there-between, which extends approximately halfway down the height of the coils, to allow independent movement between the two coils 12, as shown in FIG. 4, wherein the coil 12 on the left may be compressed (at least half way) by having a forced applied thereto, while the adjacent coil 12 on the right remains unaffected. These same coils 12 also contain attachment points 16 along the bottom half of the encasement 14 for partial attachment to the encasement 14 of the coils 12 vertically adjacent thereto. This ensures that the independent movement of the center coils 12 enabled by the separation 18 is not impeded by or does not substantially effect movement of the coils 12 otherwise adjacent to the center coils 12. The separations 18 may be in the form of a cut, slit, perforation, opening or cut-out of the encasement material 14 between adjacent coils 12 of a strand and more particularly between the closures of the encasement material 14 about each coil 12, such as by stitching or glue or welds so that each coil 12 remains entirely encased. The points or areas of attachment 16 of the encasement material 14 of one strand of coils to an adjacent strand, which are most commonly glue but may also be direct fusing of the encasement material 14, are located in a region of the coils 12 spaced from the region proximate the separations 18, such as a lower region of the coils 12, so that the points or areas of connection 16 are not laterally proximate to the separations 18. This provides a stable interconnection between the coil encasements 14 in a base or lower region of the encased coil unit 13 without interfering with or diminishing the independent coil 12 movement enabled by the separations 18. Any number, combination or pattern of connections 16 between the adjacent coil encasements 14 can be utilized. For example, as shown in FIG. 1, the advanced conformance encased spring unit is shown having a horizontal separation 18 between the two adjacent rows of coils located at the center of the unit 100.

This separation 18 does not extend along the entire row of adjacent coils but stops approximately 3 coils before reaching the opposing short edge or ends of the row. This allows for independent movement between the right and left sides of the unit 100 while still providing a cohesive spring unit 100, whereby someone sleeping on the right side of a mattress may move freely without disturbing or causing motion for someone sleeping on the left side of the mattress.

The separations 18 can be made uniformly throughout the encased coil unit 100, such as across an entire upper region of a unit 100, or in one or more areas of the unit 100, or in any pattern or patterns. Also, the size or extent of the separations 18 may be uniform or not, such as the length of a linear cut in the encasement material 14, or the number or size of openings, cut-outs or perforations in the material.

The attachment points 16 or areas may similarly be either substantially uniform throughout the unit 100, or varied as desired to similarly alter the structure of the unit 100 in particular areas or regions. There may be multiple points of attachment 16 in the material 14 between each coil 12, or a single point or area of attachment the size of which is designed to cooperate with the corresponding separations 18 in the adjacent coil encasements 14.

In another aspect of the disclosure and related inventions, the encasement material 14 is configured to have a relatively low coefficient of friction in contact with itself for enhanced sliding properties. Enhanced polyester or acrylic content are examples of optimizing the encasement material 14 for this purpose. Alternatively, the encasement material 14 may be coated with a coating with serves as a low friction-slipping agent, such as for example a silicone containing coating material. This serves to greatly reduce compression of a group of coils of the unit 100 which otherwise occurs as a result of friction of the encasement material 14 between adjacent material upon compression.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following.

What is claimed is:

1. An advanced conformance encased coil spring unit comprising:

a plurality of coils interconnected in a substantially rectangular array of columns and rows, each coil being encased in an encasement material, and each column extending between two opposing long edges of the advanced conformance encased coil spring unit with the encasement material of each coil in each column connected to the encasement material of an adjacent coil in the same column with a section of sheet material extending between the adjacent coils to form a continuous strand of coils extending between the two opposing long edges of the advanced conformance encased coil spring unit;

a partial separation defined in less than all the sections of sheet material extending between adjacent coils, each partial separation extending vertically from an upper edge of the sheet material proximate to a support surface of the advanced conformance encased coil spring unit toward a lower edge of the sheet material proximate to a lower surface of the advanced conformance encased coil spring unit, the partial separation having a terminal end opposite the upper edge of the sheet material; and one or more attachment points between the encasement material of each coil in a column and the encasement material of a horizontally adjacent coil in an adjacent column, the one or more attachment points located in a plane situated between the lower edge of the sheet material and the terminal end of the partial separation.

2. The advanced conformance coil spring unit of claim 1, wherein the one or more attachment points are formed by glue which bonds the encasement material.

3. The advanced conformance coil spring unit of claim 1, wherein, coils which are not in contact with one of the partial separations have three connection attachment points.

4. The advanced conformance coil spring unit of claim 3, wherein coils, which are in contact with one of the partial separations have three attachment points.

5. The advanced conformance coil spring unit of claim 1, wherein the encasement material is enhanced polyester or acrylic.

* * * * *